US012630406B2

(12) United States Patent
Vandekerckhove

(10) Patent No.: US 12,630,406 B2
(45) Date of Patent: May 19, 2026

(54) CONNECTOR FOR SUSPENDING A BEVERAGE KEG AND DISPENSING A BEVERAGE THEREFROM

(71) Applicant: Anheuser-Busch InBev S.A., Brussels (BE)

(72) Inventor: Stijn Vandekerckhove, Leuven (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 135 days.

(21) Appl. No.: 18/561,203

(22) PCT Filed: Jul. 29, 2022

(86) PCT No.: PCT/EP2022/071393
§ 371 (c)(1),
(2) Date: Nov. 15, 2023

(87) PCT Pub. No.: WO2023/006965
PCT Pub. Date: Feb. 2, 2023

(65) Prior Publication Data
US 2024/0253964 A1 Aug. 1, 2024

(30) Foreign Application Priority Data
Jul. 29, 2021 (BE) .................................... 2021/5602

(51) Int. Cl.
*B67D 1/04* (2006.01)
*B67D 1/08* (2006.01)
(Continued)

(52) U.S. Cl.
CPC ......... *B67D 1/0412* (2013.01); *B67D 1/0841* (2013.01); *B67D 1/0857* (2013.01);
(Continued)

(58) Field of Classification Search
CPC .. B67D 1/1405; B67D 1/0891; B67D 1/0857; B67D 1/0841; B67D 1/0412; B33Y 80/00
See application file for complete search history.

(56) References Cited

U.S. PATENT DOCUMENTS

| | | |
|---|---|---|
| D90,353 S | 7/1933 | Balton |
| D90,448 S | 8/1933 | Muend |
| (Continued) | | |

FOREIGN PATENT DOCUMENTS

| | | |
|---|---|---|
| CL | 202200237 | 10/2022 |
| CL | 202200238 | 10/2022 |
| (Continued) | | |

OTHER PUBLICATIONS

International Search Report and Written Opinion received for PCT Patent Application No. PCT/EP2022/071393, mailed on Nov. 7, 2022, 16 pages.

(Continued)

*Primary Examiner* — Jeremy Carroll
(74) *Attorney, Agent, or Firm* — Arent Fox Schiff LLP

(57) ABSTRACT

A connector (10) for a beverage container (12) is provided. The connector (10) comprises a container connecting portion (38) configured to connect to a container outlet (18) and support the container from a connection point. The connector (10) also comprises an appliance connecting portion (34) configured to connect the connector (10) to an appliance (14). The connector (10) is configured to be connected to a container and an appliance (14) so that the container (10) is suspended from the connector (10) within the appliance (14).

19 Claims, 13 Drawing Sheets

(51) Int. Cl.
*B67D 1/14* (2006.01)
*B33Y 80/00* (2015.01)

(52) U.S. Cl.
CPC ......... *B67D 1/0891* (2013.01); *B67D 1/1405* (2013.01); *B33Y 80/00* (2014.12); *B67D 2210/00031* (2013.01); *B67D 2210/00097* (2013.01)

(56) References Cited

U.S. PATENT DOCUMENTS

| | | | |
|---|---|---|---|
| 2,373,294 | A | 4/1945 | Cornelius |
| 4,252,160 | A | 2/1981 | Numbers |
| 4,655,374 | A | 4/1987 | Guerette |
| D419,362 | S | 1/2000 | Bouhuys |
| D443,792 | S | 6/2001 | Peters et al. |
| D467,764 | S | 12/2002 | Harrison et al. |
| D475,241 | S | 6/2003 | Mattiuzzo |
| D484,354 | S | 12/2003 | Mcdougall et al. |
| D497,075 | S | 10/2004 | Lassota et al. |
| D518,677 | S | 4/2006 | Van Berlo |
| D555,967 | S | 11/2007 | Rasmussen |
| D555,974 | S | 11/2007 | Miller |
| D569,162 | S | 5/2008 | Gu |
| D573,392 | S | 7/2008 | Smith |
| D583,609 | S | 12/2008 | Sluijter |
| D589,291 | S | 3/2009 | Jerstroem et al. |
| D613,107 | S | 4/2010 | Hausner et al. |
| D636,214 | S | 4/2011 | Parker et al. |
| 7,975,881 | B1 | 7/2011 | Glucksman et al. |
| D652,245 | S | 1/2012 | Richardson et al. |
| D676,701 | S | 2/2013 | Chung et al. |
| D677,509 | S | 3/2013 | Wang |
| D713,666 | S | 9/2014 | Van Baelen |
| D742,156 | S | 11/2015 | Harris et al. |
| 9,289,093 | B2 | 3/2016 | Castelli et al. |
| D772,634 | S | 11/2016 | Kuboi |
| D779,258 | S | 2/2017 | Cahen |
| D793,791 | S | 8/2017 | Mcdonald et al. |
| 9,751,743 | B2 * | 9/2017 | Taradalsky ........... B67D 1/0412 |
| D826,618 | S | 8/2018 | Hare |
| D827,353 | S | 9/2018 | Hare |
| D830,754 | S | 10/2018 | Cahen |
| D833,195 | S | 11/2018 | Mcdonald et al. |
| D849,465 | S | 5/2019 | Shin et al. |
| D860,705 | S | 9/2019 | Hirata et al. |
| D974,097 | S | 1/2023 | Li |
| D996,113 | S | 8/2023 | Bates et al. |
| 2004/0099687 | A1 * | 5/2004 | Magermans ......... B67D 1/0412 222/105 |
| 2009/0211647 | A1 | 8/2009 | Anderson et al. |
| 2018/0339894 | A1 | 11/2018 | Chu |
| 2019/0256337 | A1 | 8/2019 | Bhutani et al. |
| 2019/0256372 | A1 | 8/2019 | Park et al. |
| 2022/0242715 | A1 | 8/2022 | Kurabe et al. |

FOREIGN PATENT DOCUMENTS

| | | | | |
|---|---|---|---|---|
| CL | 202200239 | 10/2022 | | |
| EM | 000558242-0001 | 9/2006 | | |
| EM | 000876693-0002 | 3/2008 | | |
| EM | 008635668-0001 | 9/2021 | | |
| EP | 1243548 | A2 * | 9/2002 | ............... B67B 7/28 |
| WO | 99/11561 | A1 | 3/1999 | |
| WO | WO-2011002295 | A1 * | 1/2011 | ........... B67D 1/0431 |

OTHER PUBLICATIONS

International Preliminary Report on Patentability received for PCT Patent Application No. PCT/EP2022/071393, mailed on Feb. 8, 2024, 10 pages.

Amazon.co.uk, Baridi 5L Beer Draught Dispenser Tap Machine with Integrated Cooling for 5L Kegs, Available on internet at: https://www.amazon.co.uk/dp/B08P5TS42T?ref_=cm_sw_r_cp_ud_dp_PJYW0TRMB58EP6TVNRKV_2, Jan. 2, 2024, 6 pages.

Amazon.co.uk, "Krups YY2932FD 1.5 L Draught Beer Tap Dispenser—Beer Tap," Available on internet at: https://www.amazon.co.uk/dp/B071CVBDJF?ref_=cm_sw_r_cp_ud_dp_X7BPR24RZ73A7NKMFSE0_1, webpage accessed Jan. 2, 2024, 5 pages.

Amazon.com, "SPT BD-0538 Mini Kegerator & Dispenser," Available on internet at: https://www.amazon.com/dp/B01AY04QYM?ref_=cm_sw_r_cp_ud_dp_HJ4YTJNPE1QKED1DY3Z6&th=1, webpage accessed Jan. 2, 2024, 8 pages.

DrinkStuff, "Chambrer Draft Beer Dispenser," Available on internet at: http://www.drinkstuff.com/products/product.asp?ID=5901, webpage available at least as early as Dec. 20, 2011, 2 pages.

Office Action received for Bolivian Patent Application No. 00010-2022, mailed on Sep. 6, 2023, 14 pages (7 pages of English Translation and 7 pages of Original Document).

Office Action received for Chilean Patent Application No. 202200235, mailed on May 15, 2023, 19 pages (4 pages of English Translation and 15 pages of Original Document).

Perfect Draft Youtube, youtube.com, First available date: Jan. 24, 2022. Retrieved from the internet Oct. 12, 2023. <https://www.youtube.com/watch?v=8has-AMDvmc (Year: 2022)>.

Perfect Draft, perfectdraft.com, 2023. Available on internet at: https://us.perfectdraft.com/, 7 pages.

YouTube, "Heineken Blade Vs PerfectDraft Pro Pros & Cons and pouring," Available on internet at: https://www.youtube.com/watch?v=8has- AMDvmc, Jan. 24, 2022, 1 page.

"Perfect Draft Bundle", Available online at: <https://us.perfectdraft.com/products/perfectdraft-bundle>, 2024, 1 page.

"Perfect Draft Machine", Available online at: <https://us.perfectdraft.com/products/perfectdraft>, 2023, 1 page.

"Philips Perfect Draft Beer Dispenser", Available online at: <https://www.independent.co.uk/extras/indybest/food-drink/beer-cider-perry/aldi-perfectdraft-beer-dispenser-b2102607.html>, Jun. 16, 2022, 1 page.

* cited by examiner

A

B

C

D

E

F

G

H

A

B

CONNECTOR FOR SUSPENDING A BEVERAGE KEG AND DISPENSING A BEVERAGE THEREFROM

CROSS REFERENCE TO RELATED APPLICATIONS

This application is a national stage filing under 35 U.S.C. § 371 of International Patent Application No.: PCT/EP2022/071393, filed Jul. 29, 2022, which claims priority to Belgium Patent Application No. BE2021/5602, filed Jul. 29, 2021, the entire contents of each of which are incorporated by reference herein.

FIELD

The invention disclosed herein relates to a connector for the dispensing of liquids from a container and to an arrangement for dispensing beverage from a container. The connector acts to suspend the container at its outlet whilst allowing dispensing from the container when in an upright arrangement.

BACKGROUND

Dispensing of liquid, such as beverages like beer, is increasingly desired at home. However liquids such a beer require a pressurised environment to maintain freshness, thus to provide such an environment beer containers are typically heavy and cumbersome. This makes them difficult to use with an at home appliance as the home user must be able to lift and fit the container into the appliance. Often the containers need to be turned upside down to allow dispensing.

Furthermore the connection point between the container and the appliance is often more suited to commercial use, for example many use large kegs that need to be turned upside down to allow dispensing and/or require specialist tubing and cleaning apparatus. Such connection points do not allow flexibility in the size or type of the container or allow the dispensing appliance to be versatile in size or position.

Currently available systems do not provide a straightforward way of i) connecting and disconnecting a beverage container and an appliance, ii) opening the container so liquid in the inner bottle can be dispensed, including opening the outer bottle to atmosphere or connecting the outer bottle to a supply of pressurised fluid.

The present invention seeks to ameliorate these problems by providing a connector and beverage dispensing arrangement that can easily connect a beverage container and appliance and/or provide a convenient at home dispensing mechanism.

SUMMARY

According to a first aspect of the present invention, there is provided a connector for a beverage container. In an aspect, the connector is a beverage container connector. In an aspect the connector comprises a container connecting portion configured to connect to a container outlet and support the container. In an aspect the connector comprises an appliance connecting portion configured to connect the connector to an appliance. In an aspect the connector is configured to be connected to a container and an appliance so that the container is suspended from the connector within the appliance.

The use of a connector which suspends the container within the appliance avoids the major tolerance issue of flexible or variable size containers. It also allows the container to be top hung which makes it easy for the user to lift and insert the container into the appliance in a front loaded step, and to lift the container out of the appliance.

An "all-in-one" connection point simplifies the use for at home dispensing, avoiding the need for making and maintaining several connection points and the associated tubing or modifications. It also makes the connection easily recognisable and therefore more widely usable.

The connector is therefore suitable for use with appliances of various sizes, providing options for using the appliance as a countertop device, beneath cabinets, transportable or outdoor appliances etc.

The connector provides integrated gas connection for pressurising the beverage for dispensing, avoiding the need for separate connection.

By clamping directly on the container the connector provides orientationless sealing for easy insertion and connection on containers such as kegs.

The integral tap handle and valve provide a simple mechanism for controlling dispensing for at home dispense. The integral tap also allows the use of removable tubing in the beer line interface, allowing the user to dispose of and replace the tubing and/or allowing easier cleaning of the removable tubing when outside the appliance.

The connector material provides the strength to carry containers of metal or plastic and their contents.

According to a further aspect of the invention, there is provided a container comprising a connector according to any one of the above aspects.

According to a further aspect of the invention there is provided a dispensing apparatus comprising a connector according to any one of the above aspects.

According to a further aspect of the invention, there is provided a computer readable medium having stored thereon computer executable instructions that, when executed by a processor, cause the processor to control an additive manufacturing apparatus or device to manufacture the connector and or appliance of any one of the above aspects.

According to a further aspect of the invention, there is provided a method of manufacturing a device via additive manufacturing, the method comprising obtaining an electronic file representing a configuration of a product including, a surface configuration or a volume configuration of the product, wherein the product is a connector and or an appliance according to any one of the above aspects, and controlling an additive manufacturing apparatus to manufacture, over one or more additive manufacturing steps, the product according to the surface configuration specified in the electronic file.

BRIEF DESCRIPTION OF DRAWINGS

Embodiments according to the present invention will now be described, by way of example only, and with reference to the accompanying drawings, in which.

DETAILED DESCRIPTION

Figure 1:
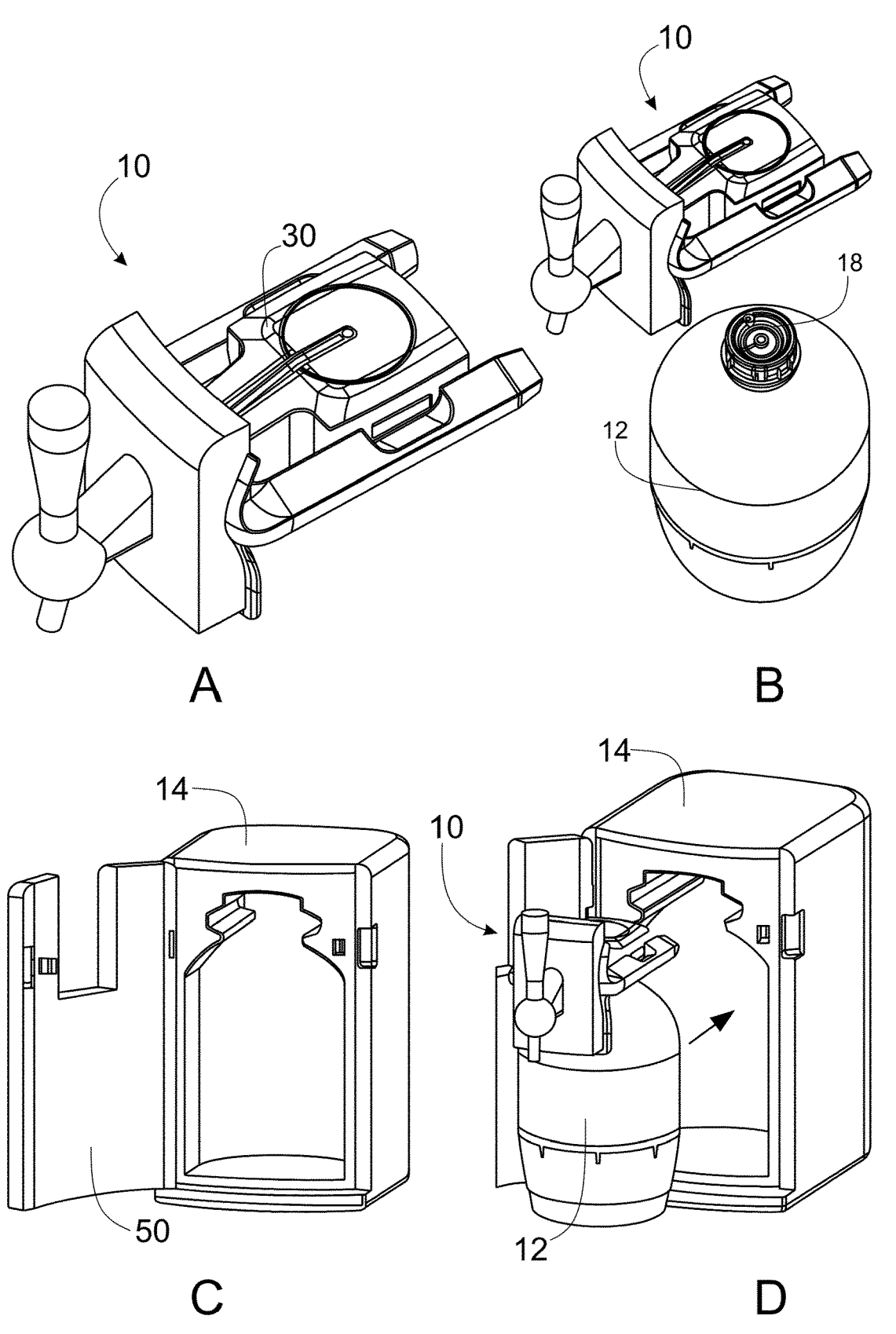
FIG. 1A shows a perspective view of a connector in accordance with an embodiment of the invention.
FIG. 1B shows a perspective view of a connector as shown in FIG. 1A and a container.
FIG. 1C shows a perspective view of an appliance in accordance with an embodiment of the invention.
FIG. 1D shows a perspective view of a connector, container and appliance.

FIG. 1A depicts a connector 10 according to an embodiment. The connector 10 comprises a connector body 30. The connector 10 is shown in more detail in FIG. 6-FIG. 8. FIG. 1 demonstrates the connector 10 in use. As shown in FIG. 1B, the connector body 30 connects to a container 12 having an outlet 18. In use, the connector body 30 is lowered onto the outlet 18 of the container 12. The container 12 is suitable for containing pressurised beverages, such as beer. The connector 10 can snap fit onto the container outlet 18. In alternative embodiments the connector 10 is fit onto the outlet 18 by rotation to engage a thread on the outlet.

Figure 2:
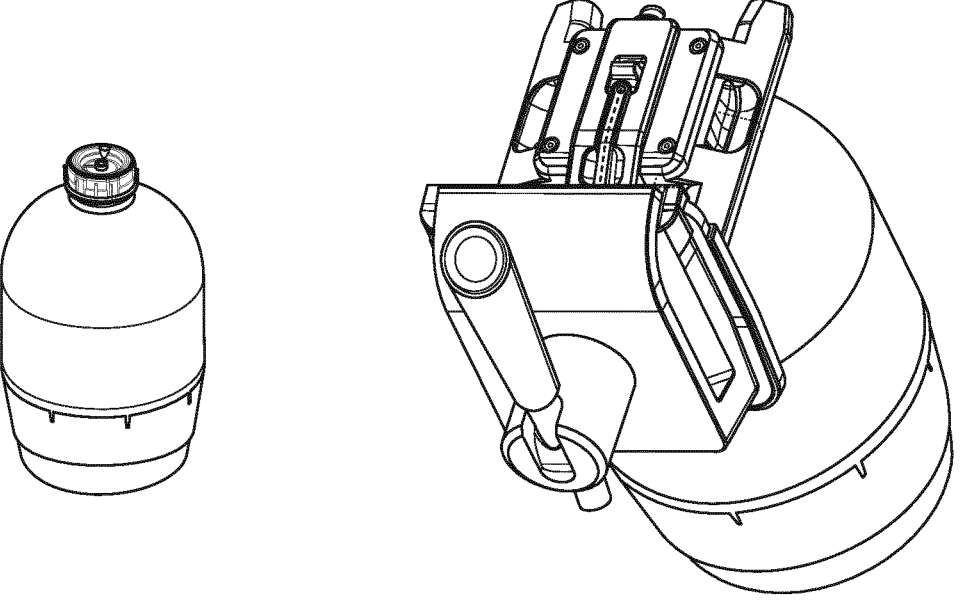
FIG. 2 shows a schematic view of a container to which a connector in accordance with the invention can be mounted and a connector attached thereto.
Figure 3:
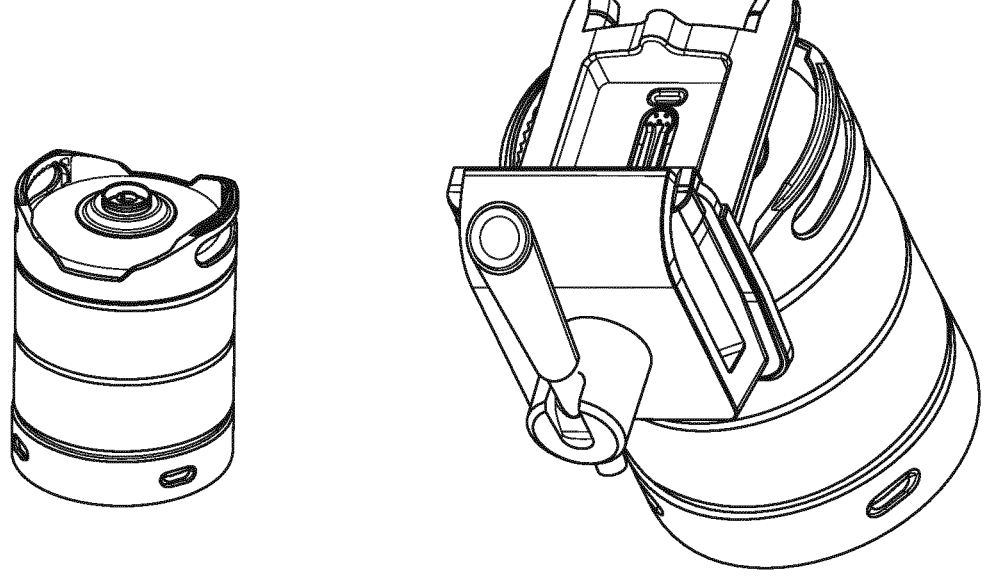
FIG. 3 shows a schematic view of a container to which a connector in accordance with the invention can be mounted and a connector attached thereto.

FIG. 1C shows an at home appliance 14 with a door 50 in an open configuration. The appliance 14 is suitable for use on a counter top or other surface e.g. table or floor. The As shown in FIG. 2 and FIG. 3 respectively, the connector 10 is usable with a plastic beverage container (FIG. 2) or a metal keg (FIG. 3). Plastic beverage containers, or one way kegs (OWK) are growing in popularity, especially for home use. When used with an OWK the connector 10 pierces the beer opening and connector 10 also comprises a lip seal to engage an air opening without orientation. The connector 10 can also be used with metal kegs, the connector 10 simultaneously engaging with the beer valve and air valve on the keg.

Figure 4:
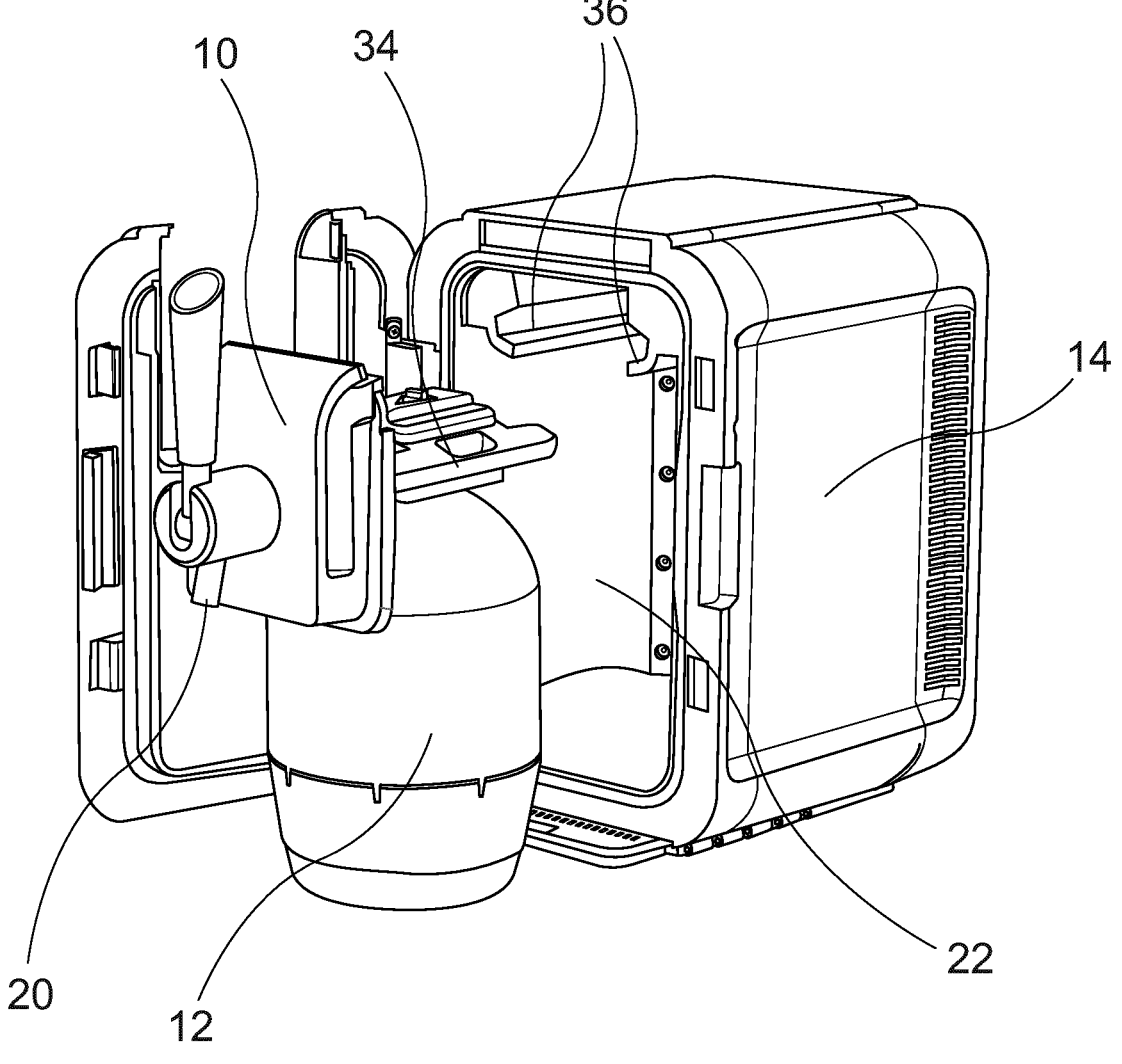
FIG. 4 shows a schematic view of an appliance and the container with the connector mounted prior to insertion into the appliance.

FIG. 4 shows a more detailed view of the connector 10, container 12 and appliance 14. As shown, the appliance 14 comprises a cavity 22 suitable for receiving the container volume. The appliance 14 comprises a pair of rails 36. The appliance rails 36 are positioned in the upper portion of the cavity 22. The connector 10 comprises an appliance connecting portion in the present embodiment in the form of rails 34. The appliance rails 36 receive complementary rails 34 on the connector 10 such that the connector 10 is slidable relative to the appliance 14. The connector 10, with or without the container 12 attached, can slide along the appliance rails 36 to a position in the appliance 14. Where a container 12 is connected to the connector 10, the container 12 is thereby suspended or hanging within the appliance 14.

The rails 34, 36 on the connector and appliance are formed from a material capable of supporting the weight of the container 12 and its contents.

This arrangement allows the user ease of insertion of the container 12 into the appliance 14. There is no requirement for close fitting connection between the connector 10 and appliance 14, therefore the tolerances required can be reduced. The arrangement also allows the connector 10 to be guided to the correct position without the need for positioning by the user. The sliding rails 34, 36 simplify the manufacturing of these parts and provide the flexibility to use containers of varying shapes and sizes without need for re sizing the connection point.

Figure 5:
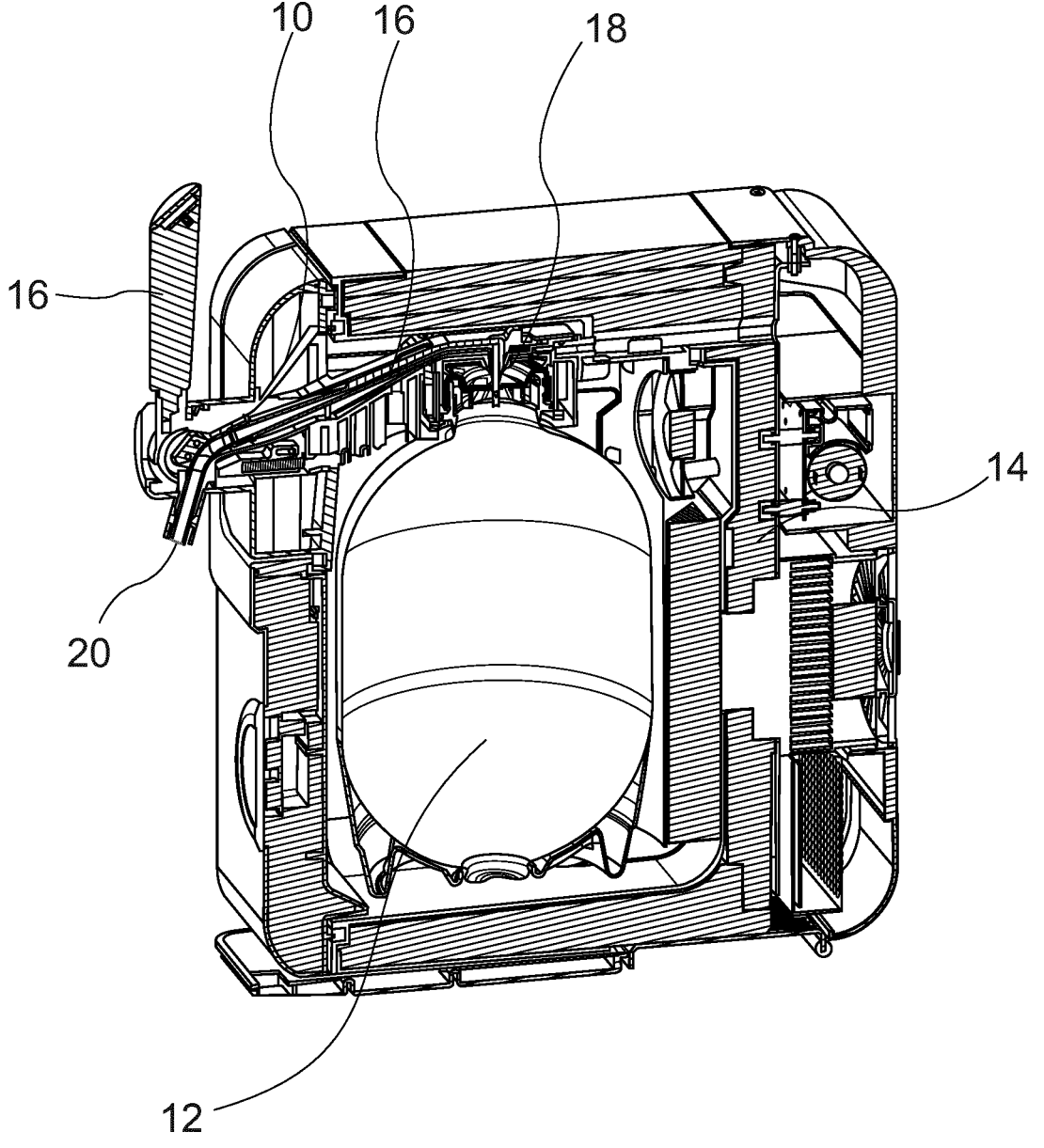
FIG. 5 shows a cross sectional view of the connector, container and appliance when the connector and container are in situ in the appliance.

FIG. 5 is a cross sectional view of the connector 10 and container 12 in situ when inserted in an appliance 14. As shown the connector 10 comprises a dispensing channel 16. Dispensing channel 16 is configured, when connected to a container 12, to convey liquid, i.e. beer, from the inside of the container 12 to a connector outlet 20. As shown the connector outlet 20 is a spout. In some embodiments, the connector 10 comprises tap handle 16 operable to open and close the dispensing channel 16. As shown in FIG. 5, the appliance 14 completely surrounds the container 12 and the container 12 is suspended from the connector 10.

Figure 6:
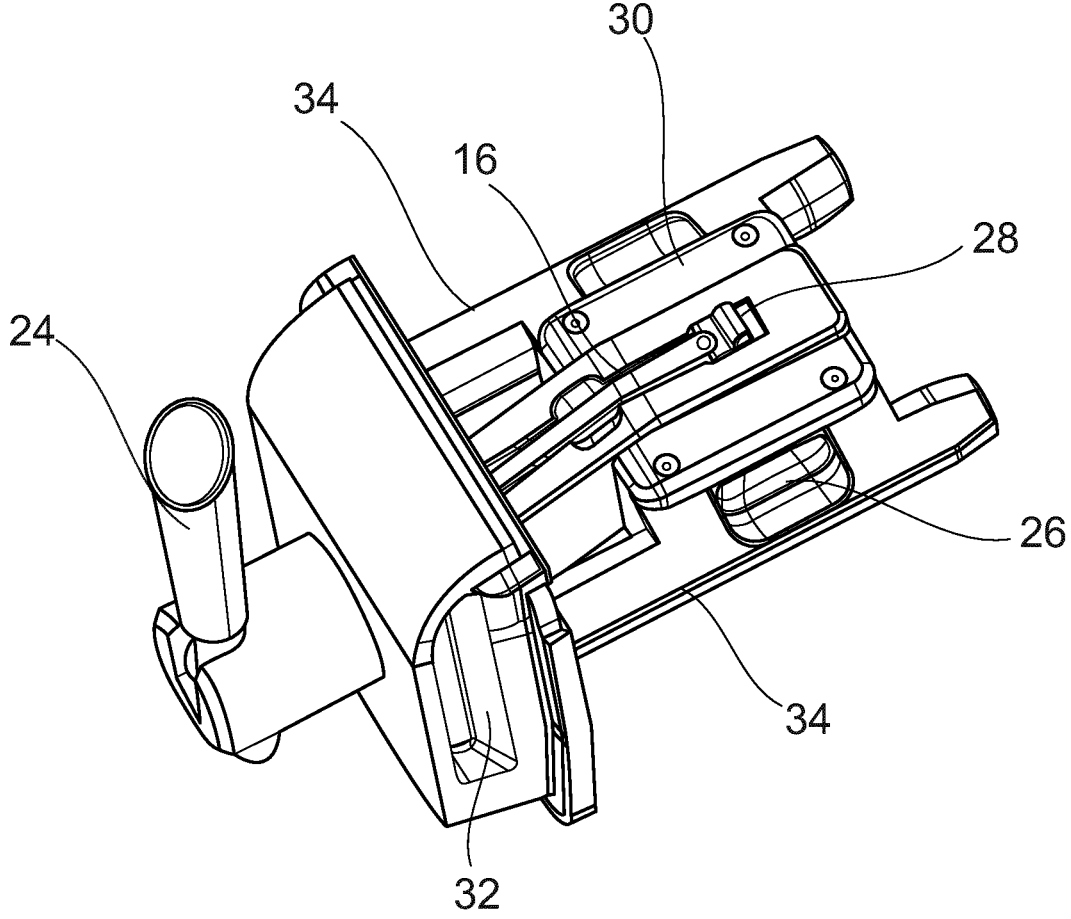
FIG. 6 shows a perspective view of the top side of a connector in accordance with the invention.

FIG. 6 shows the top surface of the connector 10. As shown the pair of rails 34 are separated by the connector body 30. Also shown is the position of the dispensing pathway 16. The dispensing pathway 16 comprises a removable channel which can be locked in place using a channel/cartridge locking portion 28. The channel/cartridge locking portion 28 comprises a central slot, visible from the top, which accommodates the cartridge or channel. The cartridge can be a tube or other suitable channel which can be removed and replaced. This allows the user to dispose of, or to clean, and replace the channel with ease. The connector body 30 also comprises grooves 32 for aiding insertion and removal by the user.

Figure 7:
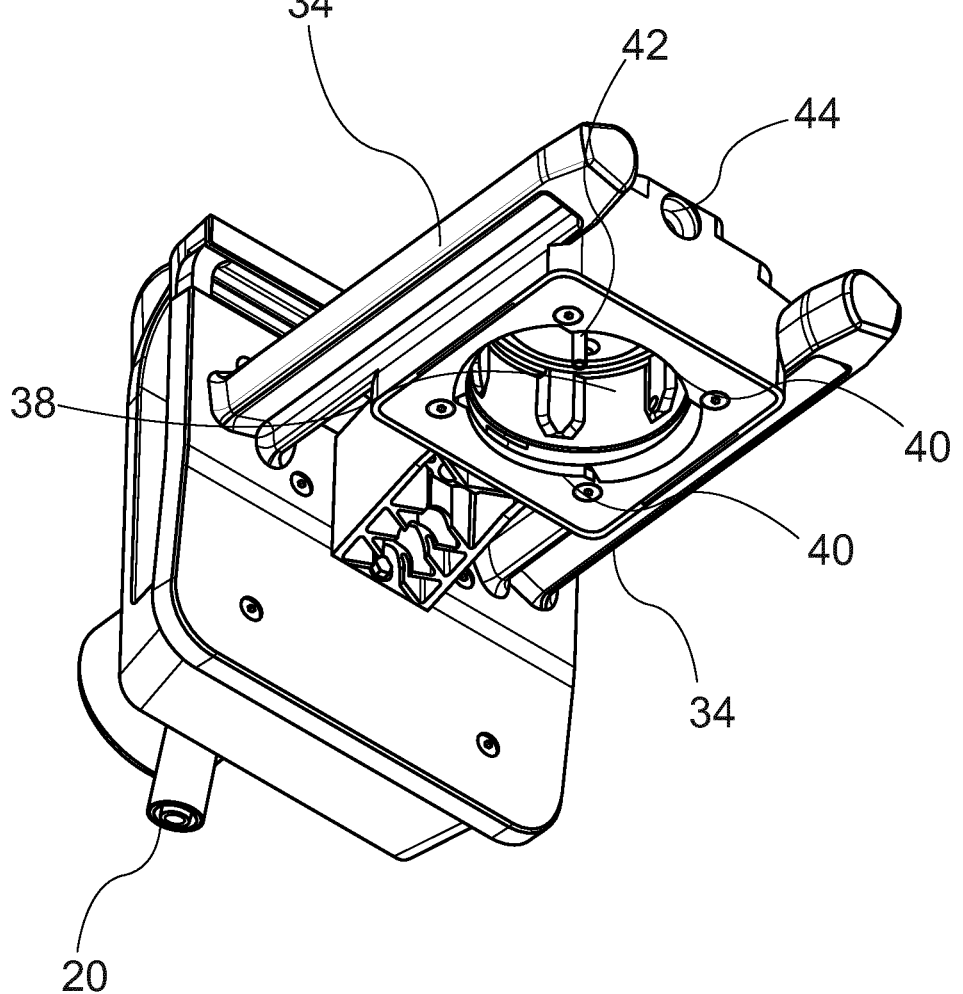
FIG. 7 shows a perspective view of the underside of a connector in accordance with the invention.

FIG. 7 shows the underside of the connector 10. The container connecting portion or coupler 38 of the connector 10 comprises a clamping surface 40 which can be rotatably engaged with a container outlet 18 or snap/push fit onto the container outlet 18. An advantage of the push fit connecting clamping surface is that it provides orientationless connection between the connector 10 and the container 12. Once connected, the container 12 is suspended from the connector 10 and can be lifted by lifting the connector 10. The clamping mechanism is suitable for supporting the weight of the container 12 and its contents.

In some embodiments, the appliance 14 has a door 50 which can be closed to enclose the suspended container 12 in the cavity 22 inside the appliance. In some embodiments the appliance 14 comprises refrigeration means for maintaining the container 12 and its contents at a predetermined temperature. The door 50 forms a seal around the connector and cavity 22 of the appliance so that the container 12 is maintained in a constant environment inside the appliance 14. The door 50 is rigid such that that the sealing is locally compressed preventing an air leak.

The connector 10 comprises an outer cladding, the shape of the outer cladding makes its functions clear to the user: A recognizable tap handle 24 is used to make the drafting function clear to the user. The main body 30 of the connector 10 shows where the OWK/metal keg should be placed. Two rails 34 on the side of the connector 10 correspond in shape with the rails/slots 36 in the appliance 14, showing the user how to insert the connector 10. The rails 34 also serve as handles for the user to lift the connector with connected container and place the combination in the appliance.

Figure 8:
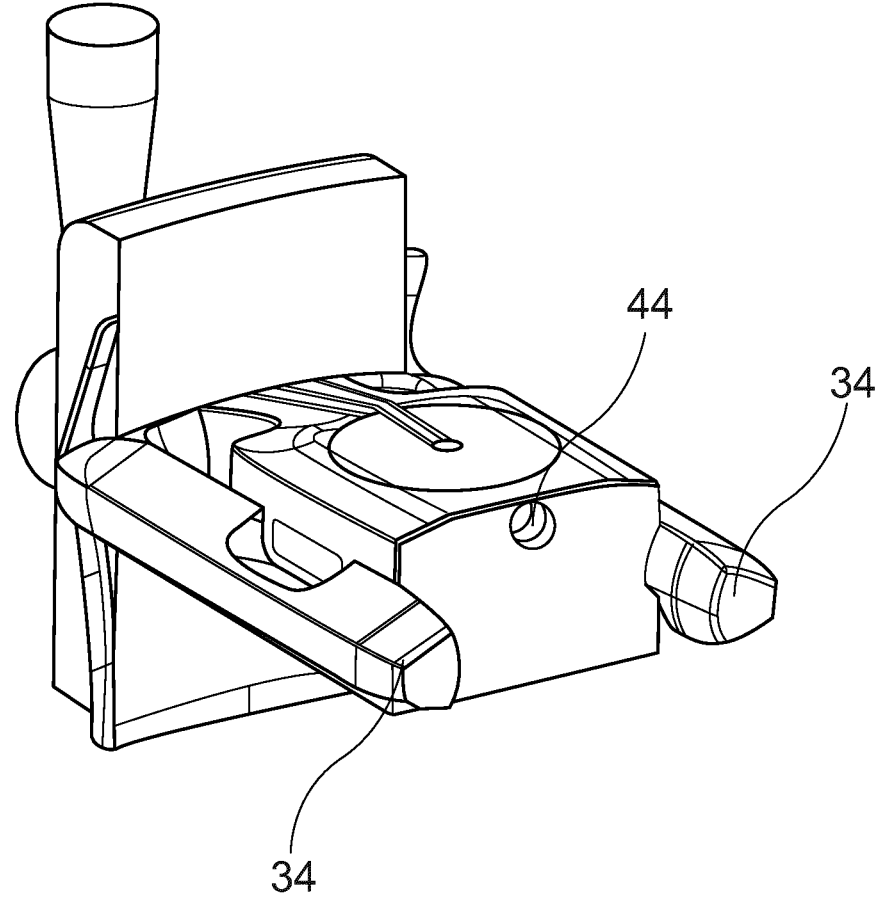
FIG. 8 shows a perspective view of the rear side of a connector in accordance with the invention.

FIG. 8 shows the rear of the connector 10. Shown is the inlet 44 for gas, for example pressurised air, which engages with a gas supply in the appliance 14. The inlet 44 receives gas and coveys it to an inner cavity of the container 12. The connector comprises a conduit for conveying the gas from the inlet to the container connecting portion 38. The container 12 takes the form of a "bottle-in-bottle" arrangement wherein an internal bottle defines an inner cavity which is compressible and an external bottle or container. The external bottle is generally rigid. In some embodiments the external bottle is rigid when in use only and is flexible when not in use. The space between the internal and external bottles defines an outer cavity (not shown). It will be understood that although the term bottle is used herein, any suitable receptacle is intended. The inner cavity is generally flexible and suitable for holding a liquid, for example a beverage such as beer. The outer cavity can be expanded by blowing (pumping) air or another suitable gas into the outer cavity via opening 18 thereby causing the inner cavity to compress. Other suitable gases include $CO_2$. When air or other suitable gas is blown into the outer cavity the external bottle is substantially rigid. Thus, when the outlet of the inner cavity is open, fluid exits the inner cavity due to the pressure acting on it. Alternatively, a single cavity receptacle could be used with a dip tube in which the gas pressure acts directly on the surface of the liquid and forces the liquid out of the cavity through the dip tube.

Figure 9:
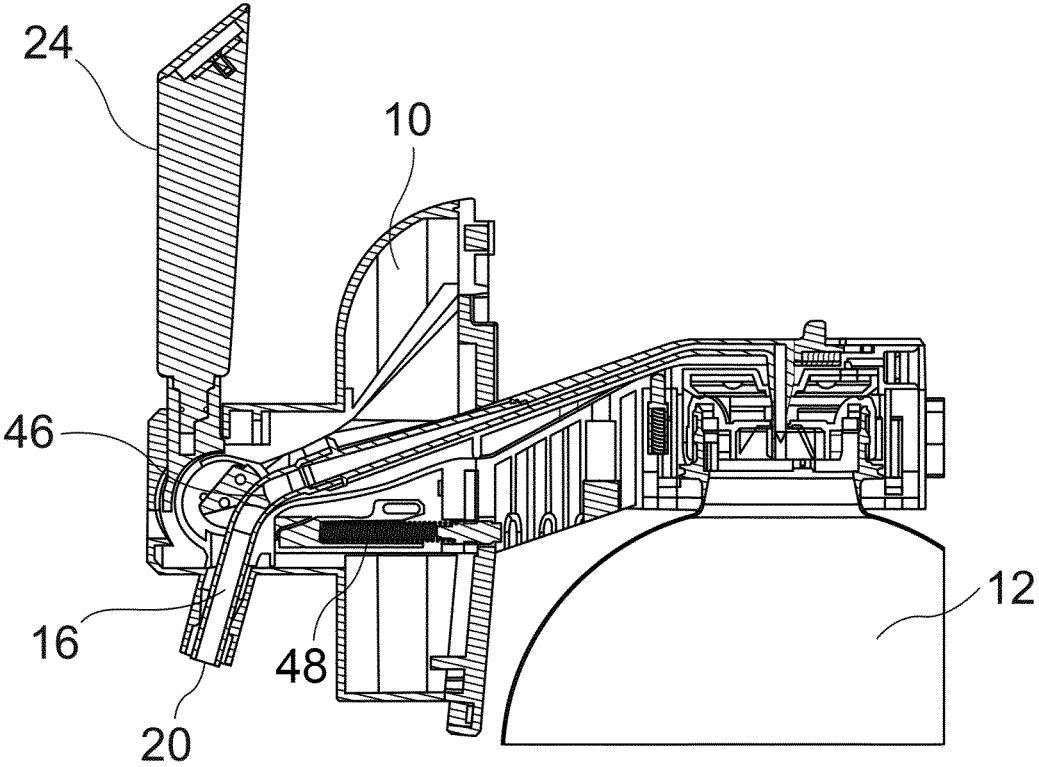
FIG. 9 shows a cross sectional view of the connector and shows dispensing path way in a closed configuration.

FIG. 9 shows the dispensing channel 16 in more detail. The dispensing channel 16 comprises dispensing tube 16 which can be replaced by the user. This removes the need for cleaning of the channel 16. The connector 10 further comprises a pinching mechanism 46 and spring 48. The dispensing tube 16 is used to transport beer from the container to the spout or outlet 20 of the connector 10. To stop the beer flow, when the tap handle 24 is closed, the tube 16 is pushed flat (pinched). The pinching mechanism 46 transfers the movement of the tap handle 24 to a lever that pinches the dispensing tube. The dispensing tube is formed from a flexible polymer, for example rubber. The spring 48 ensures that the tap handle 24 returns to the upright (closed) position if a user is no longer manipulating it. In an alternative embodiment, the pinching mechanism is constructed as an overcenter mechanism, which is bi-stable, in that it has two stable positions, but in between those two positions is unstable and will return to one or other of the stable positions. In the case, the tap handle 24 can also stay in the lowest, most open position once a user has put it there. In this open position consecutive beverages can be drafted without holding the tap handle 24. The fact that the tap handle 24 can stay in the open position allows the user to insert or retract the dispensing tube 16 from the connector 10.

It will also be understood that, although the present embodiment includes a removable dispensing tube 16 which is a separate piece which is mounted to the connector 10, in other embodiments the connector 10 could be adapted to provide an integral dispensing channel which extends between the container connecting portion 38 and the connector outlet 20 without the need for a separate dispensing tube. In such an embodiment, a shutoff valve is incorporated into the connector to replace the pinch tube. The shutoff valve is operated by the movement of the tap handle. Suitable shutoff valves include but are not limited to a ball valve, a plug valve, a cylinder valve, a gate valve, a globe valve and a pinch valve.

Figure 10:
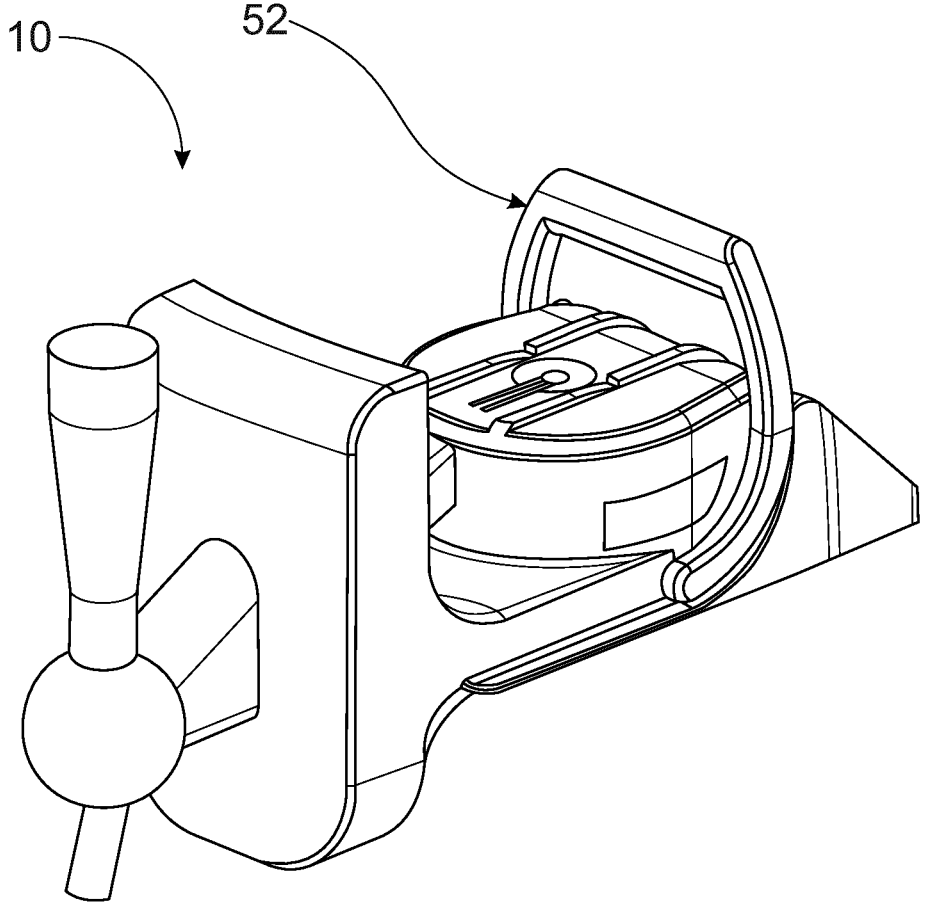
FIG. 10 shows a perspective view of a connector in accordance with an embodiment of the invention.

FIG. 10 illustrates an alternative embodiment of the connector 10. The connector 10 further comprises a handle 52. Handle 52 provides a further gripping point for the user for inserting the connector 10 and container 12 into the appliance 14. The stages of connecting the connector 10 to the container 12 and insertion of the connector 10 and container 12 into the appliance 14 is shown in FIG. 11A-H.

Figure 11:
FIG. 11A-H show depictions of a dispense apparatus invention, including the container, connector and appliance, during the loading stage in accordance with an embodiment.
Figure 11:
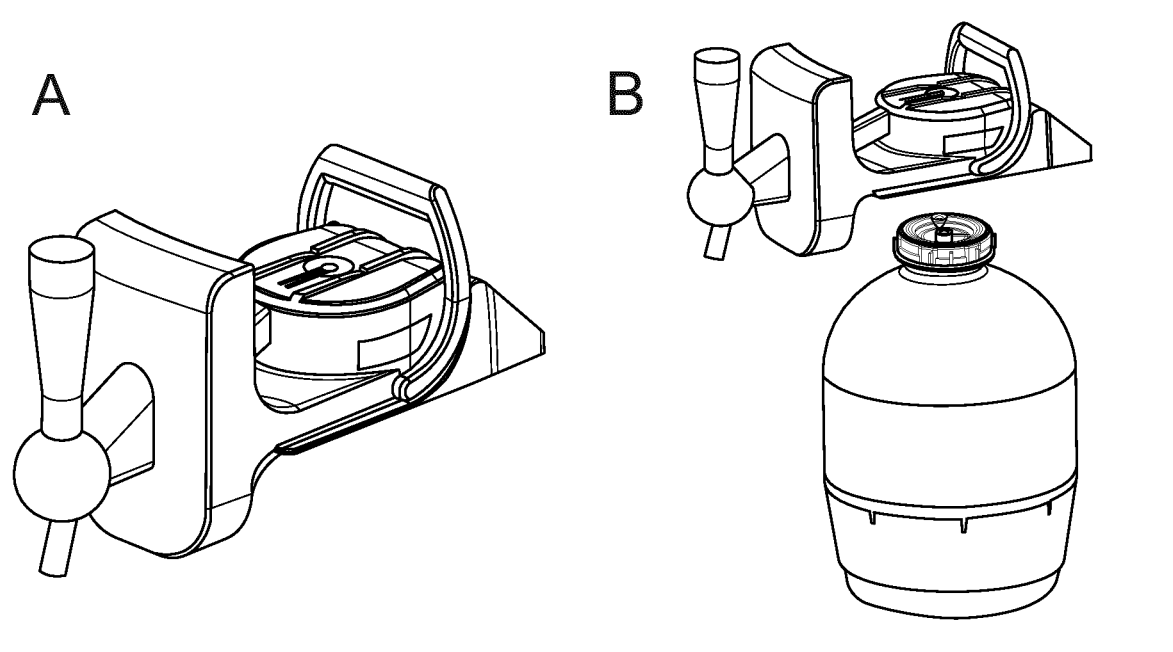
Figure 11:
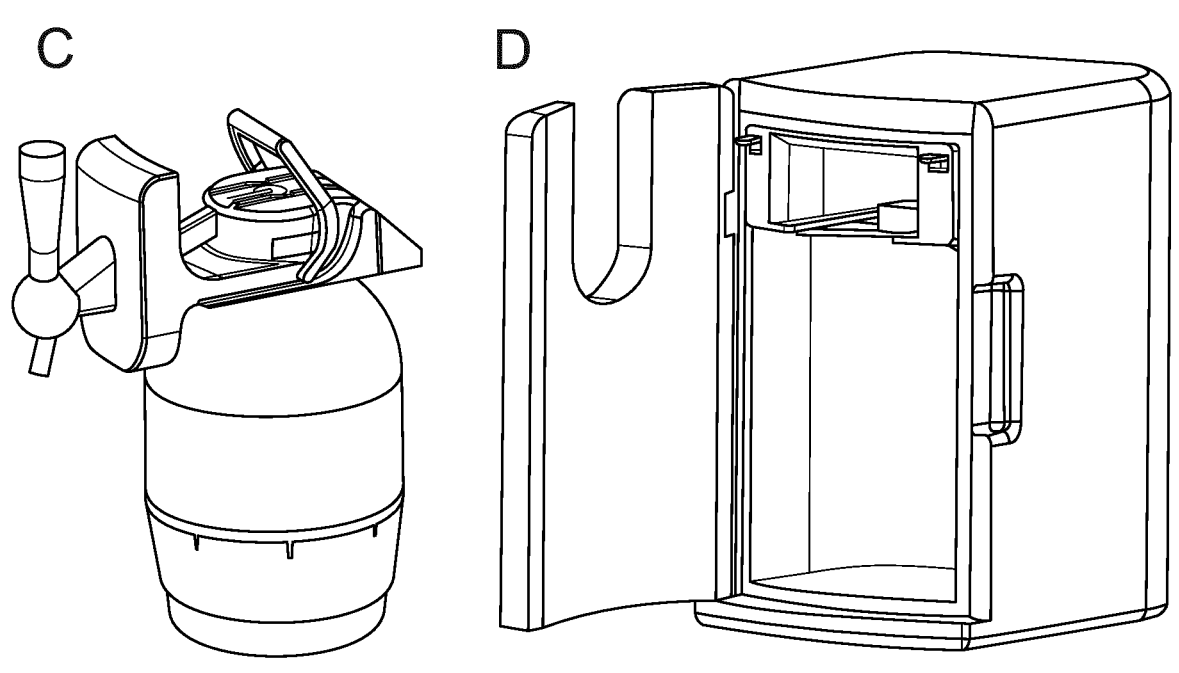
Figure 11:
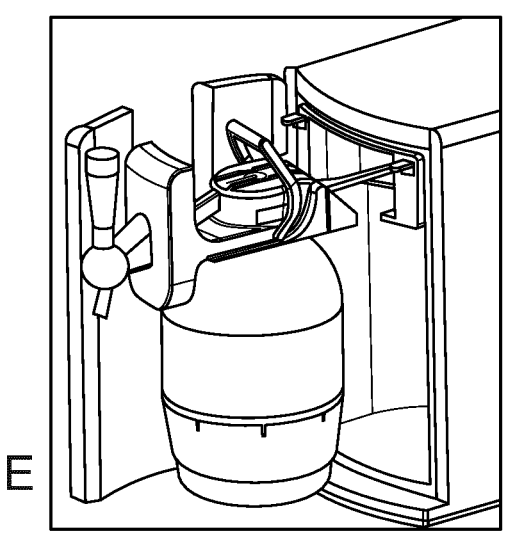
Figure 11:
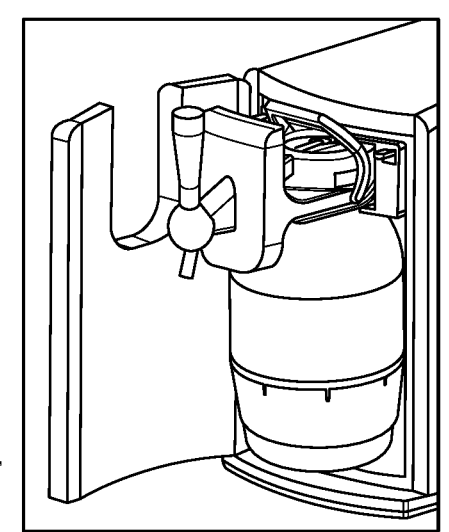
Figure 11:
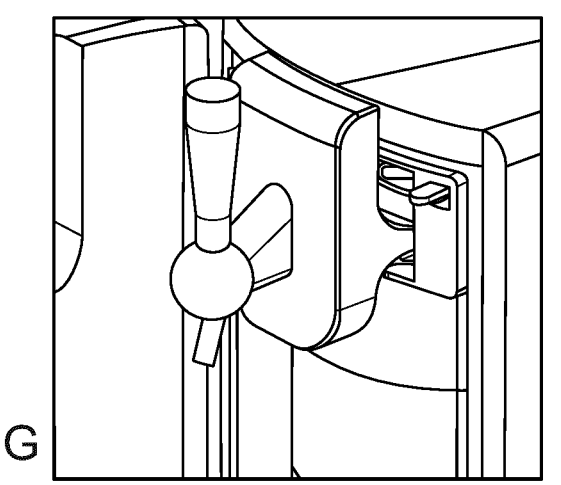
Figure 11:
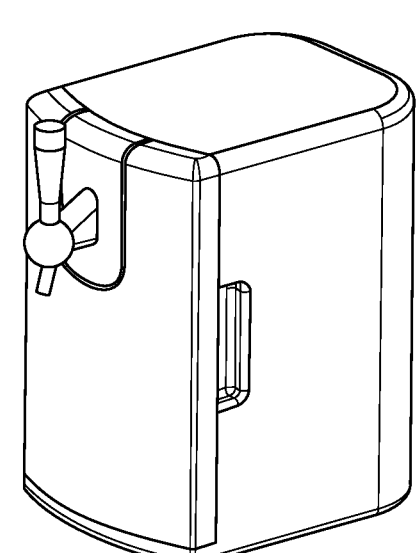
Figure 12:
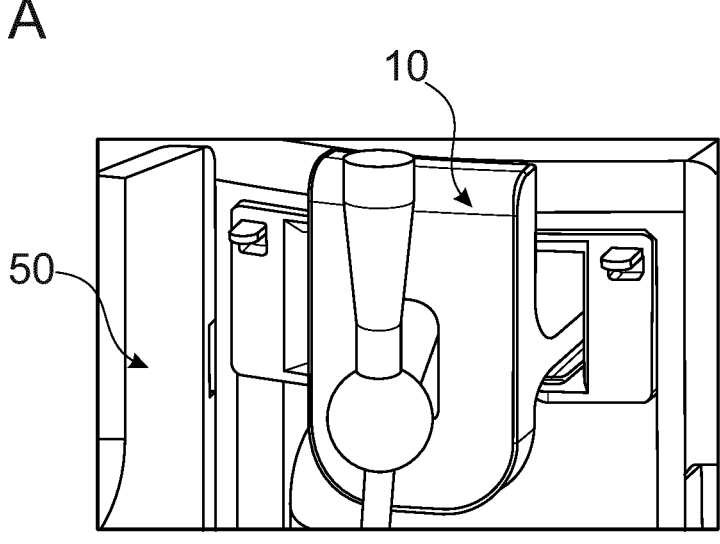
FIGS. 12A and B show depictions of a the dispense apparatus, including the container, connector and appliance, during the unloading stage.
Figure 12:
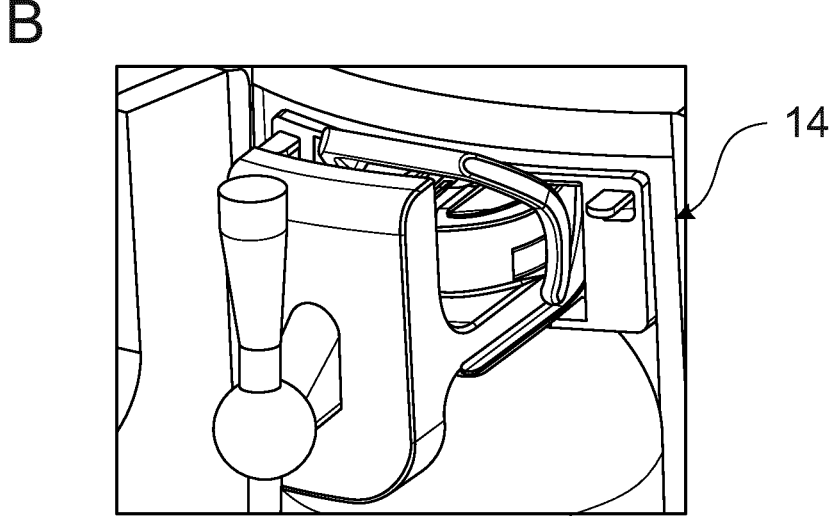
Figure 13:
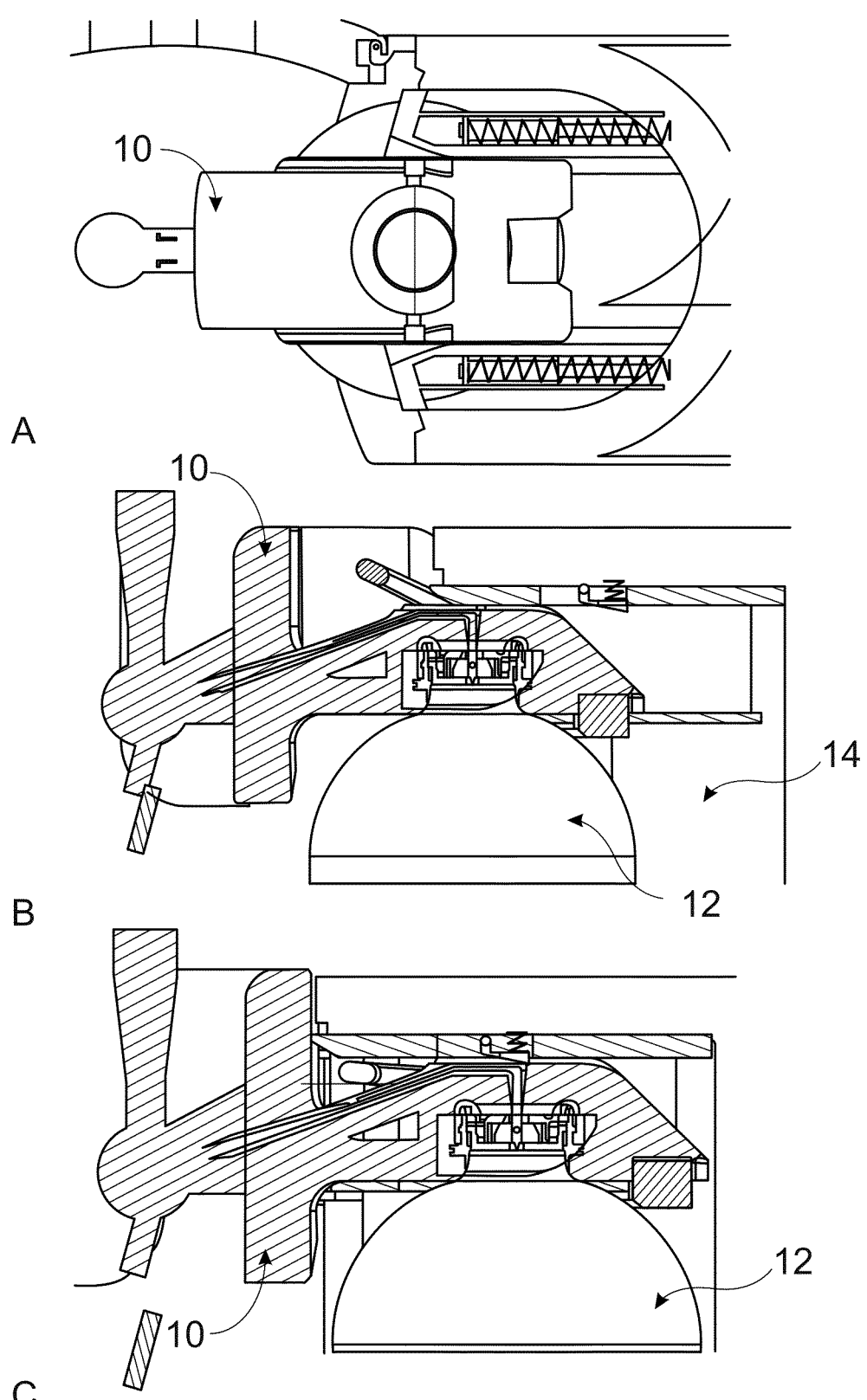
FIG. 13A shows a top view of a connector showing the ejection mechanism.
FIG. 13B shows a side view of a connector showing the handle and ejection mechanism during the loading stage.
FIG. 13C shows a side view of a connector showing the handle and ejection mechanism when the connector and container are in-situ in the appliance.

As shown in FIG. 11E-G the handle 52 is rotatable so that it folds into a collapsed position for fitting in the appliance 14. FIGS. 12A and 12B show the stages of unloading the connector 10 and container 12 from the appliance 14. In this embodiment an ejection mechanism is provided which releases the connector 10 from the appliance 14 for unloading. FIG. 13A-C show this mechanism in top and side cross sections.

The appliance includes a carriage that can travel along the receiving rails 36. The carriage is also spring loaded with springs mounted besides receiving rails 36. When the connector 10 is inserted in the appliance, it pushes carriage backwards along rails 36 thereby compressing the springs, until locking pins engage with notches on the connector. The appliance is also provided with release actuators which lift the locking pins from the notches. The compressed springs will push the connector out of the appliance and present the connector with the empty keg to the user for removal from the appliance.

The embodiments discussed herein are injection moulded, blow moulded or extrusion corrugated from a polymeric material or composite. Alternatively, the embodiments discussed herein may be partially or fully produced using additive manufacturing techniques. Accordingly, examples described herein not only include products or components as described herein, but also methods of manufacturing such products or components via additive manufacturing and computer software, firmware or hardware for controlling the manufacture of such products via additive manufacturing.

The structure of one or more parts of the product may be represented digitally in the form of a design file. A design file, for example a computer aided design (CAD) file, is a configuration file that encodes one or more of the surface or volumetric configuration of the shape of the product. That is, a design file represents the geometrical arrangement or shape of the product. Once obtained, a design file may be converted into a set of computer executable instructions that, once executed by a processor, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. The formation may be through deposition, through sintering, or through any other form of additive manufacturing method.

Design files or computer executable instructions may be stored in a (transitory or non-transitory) computer readable storage medium (e.g., memory, storage system, etc.)

storing code, or computer readable instructions, representative of the product to be produced. As noted, the code or computer readable instructions defining the product that can be used to physically generate the object, upon execution of the code or instructions by an additive manufacturing system. For example, the instructions may include a precisely defined 3D model of the product and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the product. These can be printed either in assembled or unassembled form. For instance, different sections of the product may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the product and instructing an additive manufacturing apparatus to manufacture the product in assembled or unassembled form according to the design file. The additive manufacturing apparatus may include a processor that is configured to automatically convert the design file into computer executable instructions for controlling the manufacture of the product. In these embodiments, the design file itself can automatically cause the production of the product once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

The present invention has been described above purely by way of example. Modifications in detail may be made to the present invention within the scope of the claims as appended hereto. Furthermore, it will be understood that the invention is in no way to be limited to the combination of features shown in the examples described herein. Features disclosed in relation to one example can be combined with features disclosed in relation to a further example.

The invention has been described in relation to the dispensing of beverage. It will be appreciated that the invention may equally be applied to the dispensing of any liquid.

The invention claimed is:

1. A connector for a beverage container, the connector comprising:
a container connecting portion configured to connect to a container outlet and support the container; and
an appliance connecting portion configured to connect the connector to an appliance,
wherein the connector is configured to be connected to the container and the appliance so that the container is suspended from the connector within the appliance; and
wherein an ejection mechanism is provided which releases the connector from the appliance for unloading.

2. The connector of claim 1, wherein the appliance includes a carriage that can travel along receiving rails, the carriage being spring loaded with springs mounted besides the receiving rails such that when the connector is inserted in the appliance, it pushes the carriage backwards along the receiving rails thereby compressing the springs, until locking pins engage with notches on the connector.

3. The connector of claim 2, wherein the appliance is provided with release actuators which lift the locking pins from the notches, whereupon the compressed springs will push the connector out of the appliance and present the connector to the user for removal from the appliance.

4. The connector of claim 1, further comprising a dispensing mechanism to allow dispensing of the contents of the container.

5. The connector of claim 4, comprising an outlet and wherein the dispensing mechanism comprises a channel extending between the container connecting portion and the outlet of the connector for dispensing the contents of the container, optionally wherein the channel has a replaceable dispensing tube therein.

6. The connector of claim 5, wherein the channel is a removable channel which can be locked in place using a channel locking portion.

7. The connector of claim 5, wherein the dispensing mechanism further comprises a pinching mechanism operable to open and close the channel or replaceable tube at a point between the container connecting portion and the connector outlet.

8. The connector of claim 5, comprising a tap handle operable to open or close the dispensing channel to selectively allow dispensing of the contents of the container, and optionally where the tap handle operates a pinching mechanism and/or wherein the pinching mechanism is bi-stable in both fully open and fully closed positions.

9. The connector of claim 1, wherein the connector is configured to be inserted into the appliance at a front face of the appliance, optionally through an openable closure in the front face of the appliance.

10. The connector of claim 1, wherein the connector comprises a clamping mechanism including a clamping surface, wherein the clamping surface can be either rotatably engaged with, or snap/push fit onto, a container outlet of the container, and the clamping mechanism is suitable for supporting the weight of the container and its contents.

11. The connector of claim 1, wherein the appliance connecting portion comprises a pair of rails positioned either side of the container connecting portion and shaped to interact with the appliance.

12. The connector of claim 1, further comprising an inlet suitable for mating with a gas supply outlet in the appliance, and a gas conduit extending between the inlet and the container connecting portion, whereby when a container is connected to the connector gas can travel between the inlet and an inner part of the container.

13. The connector of claim 1, wherein the connector is configured to connect with the container when the container is in an upright position.

14. The connector of claim 1, further comprising a container.

15. The connector of claim 1, wherein the container is a one way keg and the connector pierces a beer opening in the one way keg and the connector comprises a lip seal to engage an air opening of the one way keg without needing a specific orientation of the one way keg.

16. A dispensing apparatus, comprising the connector of claim 1, and the appliance, the appliance comprising a receiving portion suitable for receiving the connector and comprising a cavity suitable for receiving the container.

17. The dispensing apparatus of claim 16, wherein the appliance connecting portion comprises a pair of rails positioned either side of the container connecting portion and shaped to interact with the appliance, and wherein the receiving portion of the appliance comprises rails and the connector's rails are complementary shaped rails, wherein the connector's complementary shaped rails move against the appliance's rails to reach a fixed position within the appliance, and optionally where the complimentary shaped rails are located in an upper portion of the receiving portion of the appliance so that the container within the receiving portion of the appliance hangs from the complementary shaped rails of the connector.

18. The dispensing apparatus of claim 16, wherein the appliance comprises a cooling mechanism configured to cool the container when contained within the appliance.

19. The dispensing apparatus of claim 18, wherein the cooling mechanism comprises thermoelectric cooling to refrigerate the container when contained within the appliance.

\* \* \* \* \*